(12) United States Patent
Veronesi

(10) Patent No.: US 12,260,464 B2
(45) Date of Patent: Mar. 25, 2025

(54) SYSTEM AND METHOD FOR AUTOMATED FOREST INVENTORY MAPPING

(71) Applicant: Rezatec Limited, Oxfordshire (GB)

(72) Inventor: Fabio Veronesi, Oxfordshire (GB)

(73) Assignee: Hexcuity Limited, Oxfordshire (GB)

( * ) Notice: Subject to any disclaimer, the term of this patent is extended or adjusted under 35 U.S.C. 154(b) by 850 days.

(21) Appl. No.: 17/486,178

(22) Filed: Sep. 27, 2021

(65) Prior Publication Data
US 2023/0102406 A1    Mar. 30, 2023

(51) Int. Cl.
| | |
|---|---|
| *G06N 20/00* | (2019.01) |
| *G06F 18/214* | (2023.01) |
| *G06Q 50/02* | (2012.01) |
| *G06T 17/05* | (2011.01) |
| *G06V 20/10* | (2022.01) |

(52) U.S. Cl.
CPC .......... *G06Q 50/02* (2013.01); *G06F 18/214* (2023.01); *G06N 20/00* (2019.01); *G06T 17/05* (2013.01); *G06V 20/188* (2022.01)

(58) Field of Classification Search
CPC ...... G06Q 50/02; G06F 18/214; G06N 20/00; G06T 17/05; G06V 20/188
See application file for complete search history.

(56) References Cited

U.S. PATENT DOCUMENTS

| | | | |
|---|---|---|---|
| 2013/0211721 A1* | 8/2013 | Parisa | G06V 10/811 |
| | | | 702/2 |
| 2014/0077969 A1 | 3/2014 | Vian et al. | |
| 2014/0163772 A1* | 6/2014 | Vian | G05D 1/0202 |
| | | | 701/2 |
| 2020/0066034 A1* | 2/2020 | Tham | G05D 1/0016 |
| 2021/0097850 A1 | 4/2021 | Ton-That et al. | |
| 2021/0118117 A1 | 4/2021 | Albrecht et al. | |

OTHER PUBLICATIONS

Viegas et al., "Geographic Normalization: what is it and what are its implications?," retrieved from the Internet: https://www.aquare.la/en/geographic-normalization-what-is-it-and-what-are-its-implications, retrieved on Aug. 23, 2023.

* cited by examiner

*Primary Examiner* — Jennifer N Welch
*Assistant Examiner* — Amy P Hoang
(74) *Attorney, Agent, or Firm* — Foley & Lardner LLP

(57) ABSTRACT

A system and method for automated forest inventory mapping. The method may include receiving an image depicting an overhead view of a wooded area, the image comprising a plurality of pixels; receiving a set of climate data for a geographic region in which the wooded area is located; receiving a point cloud of a digital surface model of the wooded area; concatenating data corresponding to the plurality of pixels of the image, the set of climate data, and the point cloud into a feature vector; executing a machine learning model using the feature vector to generate timber data for each of the plurality of pixels of the image; and generating an interactive overlay from the timber data, the interactive overlay comprising the generated timber data for each of the plurality of pixels of the image.

20 Claims, 9 Drawing Sheets

FIG. 7

SYSTEM AND METHOD FOR AUTOMATED FOREST INVENTORY MAPPING

BACKGROUND

The forest industry needs technological advances to help with a variety of challenges. The forest industry deals with ever-fluctuating markets, cross-border tariffs, uncertainty on the timing and level of demand for housing starts, and the forecasted surge in demand for engineered wood products. Furthermore, every year sees a wildfire catastrophe in major producing countries, while pest, disease and other disturbance destroy vast areas. Salvage operations cost dearly and the threat to forest resource supply compounds operational issues.

Sustainable forest management is essential, yet it is difficult and expensive to ensure forest biodiversity, facilitate healthy ecosystems, and maintain and conserve clean soil and water resources. Faced with these complexities, conventional lumber, paper, pulp, and wood products manufacturers look for new ways of monitoring and managing their forests to drive down costs and realize value.

Traditionally, foresters have relied on infrequent and geographically limited aerial surveys, backed up by boots-on-the-ground assessments to manage stands and monitor the impact of disturbances. Filling intelligence gaps in-between surveys is a challenge as is getting ground resources to the right place at the right time to maximize impact.

SUMMARY

Aspects of example embodiments of the present disclosure relate generally to providing an improved forest inventory by capturing a distribution and intermixing of different tree species within a forest and estimating a total volume and biomass of available timber in forest areas. Advantageously, the improved forest inventory system models tree count, height, and parameters to characterize the forest using optical data, synthetic-aperture radar (SAR) data, topographical data, and other data. The system, method, apparatus, and computer-readable medium described herein provide a technical improvement to modeling forests.

In accordance with some embodiments of the present disclosure, a method is disclosed. The method may include receiving, by one or more processors, an image depicting an overhead view of a wooded area, the image comprising a plurality of pixels; receiving, by the one or more processors, a set of climate data for a geographic region in which the wooded area is located; receiving, by the one or more processors, a point cloud of a digital surface model of the wooded area; concatenating, by the one or more processors, data corresponding to the plurality of pixels of the image, the set of climate data, and the point cloud into a feature vector; executing, by the one or more processors, a machine learning model using the feature vector to generate timber data for each of the plurality of pixels of the image; and generating, by the one or more processors, an interactive overlay from the timber data, the interactive overlay comprising the generated timber data for each of the plurality of pixels of the image.

In accordance with some other embodiments of the present disclosure, a system is disclosed. The system may include one or more processors configured by machine-readable instructions to receive an image depicting an overhead view of a wooded area, the image comprising a plurality of pixels; receive a set of climate data for a geographic region in which the wooded area is located; receive a point cloud of a digital surface model of the wooded area; concatenate data corresponding to the plurality of pixels of the image, the set of climate data, and the point cloud into a feature vector; execute a machine learning model using the feature vector to generate timber data for each of the plurality of pixels of the image; and generate an interactive overlay from the timber data, the interactive overlay comprising the generated timber data for each of the plurality of pixels of the image.

In accordance with yet other embodiments of the present disclosure, a non-transitory computer-readable media having computer-executable instructions embodied thereon is disclosed. The computer-executable instructions when executed by a processor, cause the processor to perform a process including receiving an image depicting an overhead view of a wooded area, the image comprising a plurality of pixels; receiving a set of climate data for a geographic region in which the wooded area is located; receiving a point cloud of a digital surface model of the wooded area; concatenating data corresponding to the plurality of pixels of the image, the set of climate data, and the point cloud into a feature vector; executing a machine learning model using the feature vector to generate timber data for each of the plurality of pixels of the image; and generating an interactive overlay from the timber data, the interactive overlay comprising the generated timber data for each of the plurality of pixels of the image.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7 is an example of a training data set for training a machine learning model to generate timber data, in accordance with some embodiments.

Figure 1:
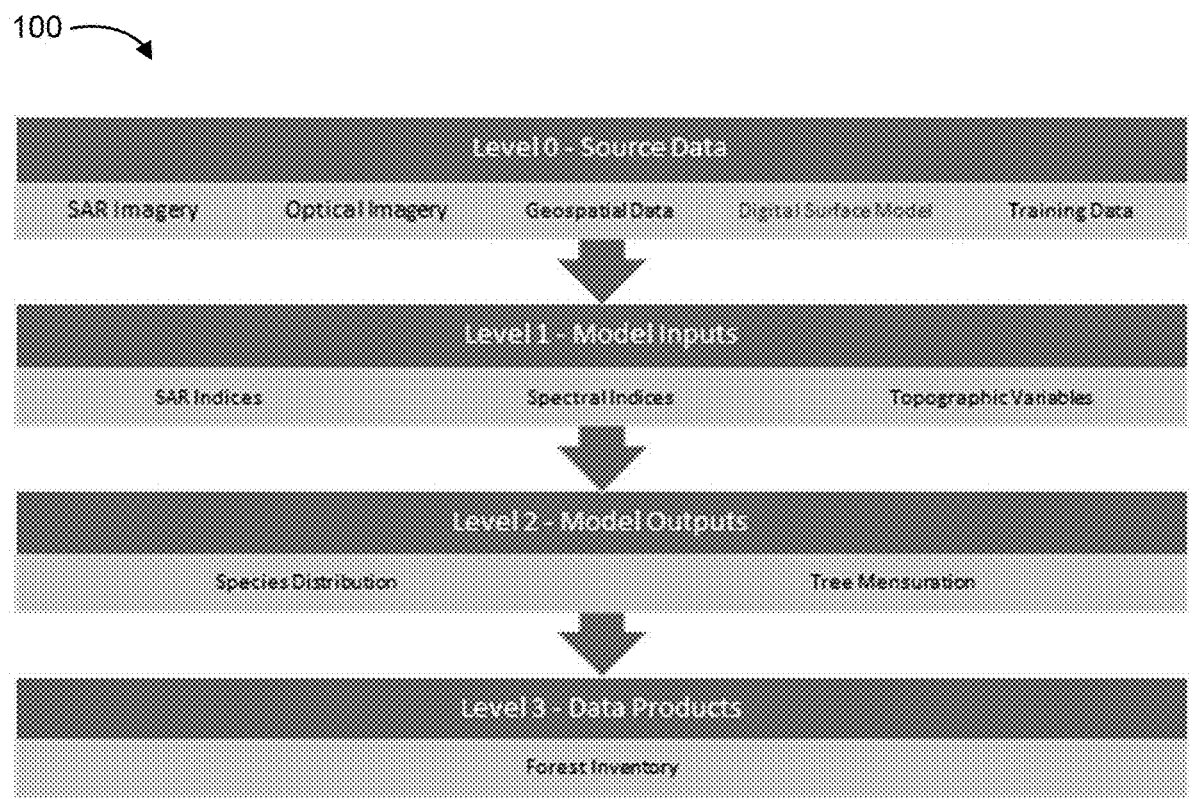
FIG. 1 illustrates a summary of workflow and processing levels in the development of data products ranging from Level 0 (Source Data) through to Level 3 (Final Data Products), in accordance with some embodiments.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, in the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

As previously mentioned, when attempting to determine and maintain an accurate record of a forest inventory, computers often times are forced to rely on infrequent and geographically limited aerial surveys (e.g., images taken using aerial devices) as well as boots-on-the-ground assessments. Filling intelligence gaps in-between surveys is a challenge as is getting ground resources to the right place at the right time to maximize impact. Such methods are often inaccurate because the resolution of the limited aerial surveys may be too low for the computer to accurately identify objects within the surveys, the tree trunks of the trees may be hidden from view of the aerial survey by the trees' leaves, and the measurements of the boots-on-the-ground assessments may be too infrequent and too difficult to capture over larger areas.

In one example, when a company requests to determine a count of the tree volume within a given area, a computer not using the methods described herein may identify an image of the area and attempt to use object recognition techniques on the image. The computer may determine the number of trees that are within the image using such techniques. The computer may then attempt to determine the amount of timber (or lumber) that is in the area based on the number of trees, providing a rough estimate of the amount of timber that is present in the area that may be inaccurate for a number of reasons as described above.

Implementations of the systems and methods discussed herein overcome these technical deficiencies because they provide an improved method for determining a forestry inventory using artificial intelligence processing. A computer may train a machine learning model to use an image in addition to other data (e.g., synthetic-aperture radar (SAR) imagery, optical imagery, geospatial data, and digital surface model data) to output timber data (e.g., forest inventory data) such as the volume of the timber depicted in the image as well as other forest inventory data such as tree species distribution data and tree mensuration data. The input data may include satellite data, incorporating datasets derived from both radar and optical satellite sensors. Other geospatial data sources such as elevation data may also be integrated where it is available in a suitable format and resolution, with all data sources processed to a resolution grid for subsequent analysis and data product outputs. Inclusion of digital surface model data in the input data alone improves the accuracy of the machine learning model's predictions compared to other methods and machine learning models by 15-20%. Accordingly, upon receiving a request for forest inventory data for a particular region, the computer may execute the trained machine learning model using an image of the region as well as the other data including the digital surface model data to obtain output timber data and provision the output timber data to the requesting device.

Thus, the present disclosure describes the use of satellite imagery and artificial intelligence (AI) processing techniques to remotely provide a view of an entire forest inventory across vast geographic areas and to analyze disturbance events that threaten its value. This solution helps manage inventory, carbon stock, fire damage, pest, and disease, brushing, and mill optimization.

Advantageously, the embodiments described herein track the full forest lifecycle across seasons, fusing satellite and multiple data feeds with advanced AI. The embodiments provide frequent, accurate insights to dynamically manage inventory, driving large-scale efficiencies and cost savings, boosting productivity and competitive advantage, and optimizing timber value.

FIG. 1 summarizes workflow and processing levels 100 in the development of data products ranging from Level 0 (Source Data) through to Level 3 (Final Data Products). Source data can include synthetic-aperture radar (SAR) imagery, optical imagery, geospatial data, digital surface models, and training data. SAR imagery can be obtained from ESA Sentinel-1 and ALOS-2 PALSAR satellites. Optical multi-spectral imagery can be obtained from an ESA Sentinel-2 satellite.

Among the additional geospatial data, the system extracts elevation, slope, and aspect from databases such as the United States Geological Service (USGS) National Elevation Dataset and climate data (precipitation, temperature, and solar radiation) from ClimNA, which may be specific to North America. Soil data may also be included in the modeling from databases such as the gNATSGO database. Digital surface model data can be included in the list of predictors to further increase the accuracy of the model output. These sources are used to generate inputs to a model. The inputs can be SAR indices, spectral indices, and values for topographic variables.

The model may generate species distribution (e.g., the distribution and intermixing of different tree species within a forest) and/or tree mensuration (e.g., estimates of the total volume and/or biomass of available timber in forest areas and additionally models of total tree count, height and/or the diameter at breast height (DBH) parameters) data.

Figure 2:
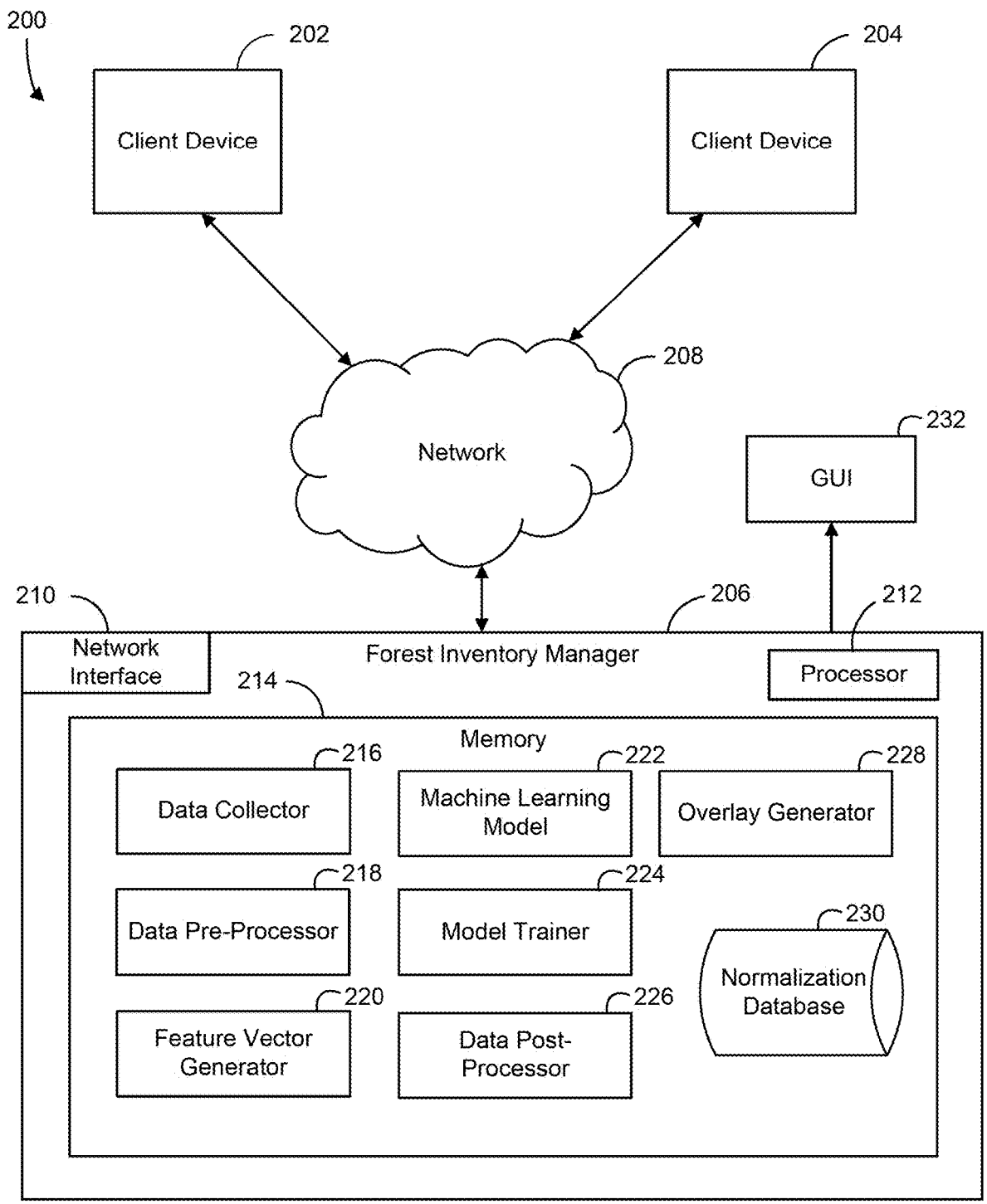
FIG. 2 is an illustration of an example forest inventory management system, in accordance with some embodiments.

Referring now to FIG. 2, an illustration of an example forest inventory management system 200 is shown, in some embodiments. In brief overview, system 200 can include two client devices 202 and 204 that communicate with a forest inventory manager 206 over a network 208. These components may operate together to generate an overlay with timber data that can illustrate timber data about geographical regions represented by individual pixels of images. System 200 may include more, fewer, or different components than shown in FIG. 2. For example, there may be any number of client devices or computers that make up or are a part of forest inventory manager 206 or networks in system 200.

Client devices 202 and 204 and/or forest inventory manager 206 can include or execute on one or more processors or computing devices and/or communicate via network 208. Network 208 can include computer networks such as the Internet, local, wide, metro, or other area networks, intranets, satellite networks, and other communication networks such as voice or data mobile telephone networks. Network 208 can be used to access information resources such as web pages, websites, domain names, or uniform resource locators that can be presented, output, rendered, or displayed on at least one computing device (e.g., client device 202 or 204), such as a laptop, desktop, tablet, personal digital assistant, smartphone, portable computers, or speaker. For example, via network 208, client devices 202 and 204 can request, from forest inventory manager 206, timber data about different geographic regions that are depicted in aerial images of the regions.

Each of client devices 202 and 204 and/or forest inventory manager 206 can include or utilize at least one processing unit or other logic devices such as a programmable logic array engine or a module configured to communicate with one another or other resources or databases. The components of client devices 202 and 204 and/or forest inventory manager 206 can be separate components or a single component. System 200 and its components can include hardware elements, such as one or more processors, logic devices, or circuits.

Forest inventory manager 206 may comprise one or more processors that are configured to generate timber data about geographic regions based on optical data, SAR imagery, geospatial data, and digital surface model data. Forest inventory manager 206 may comprise a network interface 210, a processor 212, and/or memory 214. Forest inventory manager 206 may communicate with client devices 202 and 204 via network interface 210. Processor 212 may be or include an ASIC, one or more FPGAs, a DSP, circuits containing one or more processing components, circuitry for supporting a microprocessor, a group of processing components, or other suitable electronic processing components. In some embodiments, processor 212 may execute computer code or modules (e.g., executable code, object code, source code, script code, machine code, etc.) stored in memory 214 to facilitate the activities described herein. Memory 214 may be any volatile or non-volatile computer-readable storage medium capable of storing data or computer code.

Memory 214 may include a data collector 216, a data pre-processor 218, a feature vector generator 220, a machine learning model 222, a model trainer 224, a data post-processor 226, an overlay generator 228, and a normalization database 230. In brief overview, components 216-230 may cooperate to collect different types of data and images of a geographical region. Components 216-230 may generate a feature vector from data and the images and input the feature vector into a machine learning model that has been trained to output timber data for individual pixels of images. The machine learning model may output timber data for the image and components 216-230 may generate an interactive overlay from the timber data for display on a graphical user interface (GUI) 232. Components 216-230 may place the interactive overlay over the image such that a user may select or place a cursor over the different pixels of the image on the GUI 232 to view timber data for the geographic area that the image is depicting.

Data collector 216 may comprise programmable instructions that, upon execution, cause processor 212 to collect geographical data from different sources. For example, data collector 216 may receive an image of a wooded area. The image may be an optical photograph of the wooded area taken from above the wooded area such as by a satellite or another flying vehicle. Data collector 216 may receive the image of the wooded area from an entity or company that specializes in capturing and transmitting such photographs. For example, data collector 216 may receive the image from an ESA Sentinel-2 satellite. Additionally, in some embodiments, data collector 216 may receive photographs or radar data of the wooded area such as photographs or radar data collected from ESA Sentinel-1 and/or ALOS-2 PALSAR satellites.

Data collector 216 may receive climate data for a geographic region of the wooded area. The geographic region may be the geographic area and/or coordinates of the wooded area (e.g., the climate data for the coordinates of the geographic area). The climate data may include information about the climate of the wooded area (e.g., precipitation, temperature, solar radiation, etc.). Data collector 216 may receive the climate data from an online database or from a data source provider that collects and maintains records of the climates around the world (e.g., weather service providers, ClimNA, etc.). In some embodiments, data collector 216 may receive other data related to the wooded area such as the elevation and slope at different points within the wooded area or of the wooded area as a whole. Data collector 216 may receive such data from online data source providers such as, but not limited to, the USGS National Elevation Dataset. In some embodiments, data collector 216 may collect or receive soil data (e.g., the types of soil, the amount of soil, the PH level of the soil, etc.) about the wooded area. Data collector 216 may receive such soil data from data source providers such as, but not limited to, the gNATSGO database.

Data collector 216 may receive point cloud data of a digital surface model for the wooded area. The point cloud data may include many different metrics of the wooded area at various points. For example, the point cloud data may indicate the maximum height of the wooded area to be the highest points on trees, buildings, hills, etc., within the wooded area. The point cloud data may have a 25 cm resolution (e.g., the point cloud may indicate the maximum height every 25 cm within the wooded area), or a resolution that is sharper than the resolution of the climate data and/or optical or radar data. Data collector 216 may receive the point cloud data from a data source provider that provides digital surface models for various geographic regions.

Data collector 216 may determine if the image, the climate data, and/or the point cloud of the digital surface model have matching resolutions. For example, because the different types of data are collected from different sources and generally collected using different methods, the data may be collected with different granularities and with different levels of detail. For example, the climate data and/or soil data may be generic across the wooded area because there may not be much of a difference in climate or soil between the areas represented by the pixels of the image. However, other data, such as point cloud data, elevation data, and/or slope data, may have a higher resolution than the pixels of the image as it may be captured using a more nuanced device. Data collector 216 may compare the resolutions of the different types of data, including the image, data collector 216 has collected about the wooded area to determine if the data and the image have matching resolutions.

Data pre-processor 218 may comprise programmable instructions that, upon execution, cause processor 212 to pre-process the data that data collector 216 collects into data with matching resolutions. For example, data pre-processor 218 may adjust the resolutions of the data in response to determining the data does not have a matching resolution. Data pre-processor 218 may determine the point cloud data of the digital surface model for the geographic region of the wooded area has a resolution of 25 centimeters and the resolution of the image is 10 meters. Accordingly, data pre-processor 218 may reduce the resolution of the point cloud data to match the resolution of the image. To do so, data pre-processor 218 may identify the values (e.g., the height values) of the point cloud data that correspond to individual pixels of the image (e.g., correspond to the same geographic area as the individual pixels of the image). Data pre-processor 218 may determine the average height values of the identified values for each pixel of the image and generate a vector from the average height values with a number of dimensions that match the number of pixels of the image (e.g., a vector with an average height value for each pixel of the image). Similarly, in another example, data pre-processor 218 may normalize the climate data, elevation data, slope data, and/or soil data into a vector that matches the number of pixels of the image. Such a vector may include the same value at each index value of the image unless more fine-grained data (e.g., higher resolution data) about the soil, climate, or elevation is available for the geographic area that is depicted in the image. This pre-processing technique may enable data pre-processor 218 to evaluate the image and determine timber data for the image on a pixel-by-pixel basis.

Feature vector generator 220 may comprise programmable instructions that, upon execution, cause processor 212 to generate a feature vector from the collected or received data. For example, feature vector generator 220 may concatenate a feature vector from the received data. Feature vector generator 220 may do so in response to determining the collected data has a matching resolution to the image and/or after data pre-processor 218 pre-processes the received data. Feature vector generator 220 may concatenate the values of the point cloud (e.g., the adjusted values of the point cloud) and the climate data to the image vector to create a feature vector that can be input into a machine learning model. In some embodiments, feature vector generator 220 may additionally or instead concatenate soil data, radar data, elevation data, etc., about the geographic region with the image vector to create the feature vector. Accordingly, feature vector generator 220 may generate a feature vector using the image and information about the geographic region depicted in the image that can be input into a machine learning model to generate timber data about the vegetation of the wooded area depicted in the image.

In some embodiments, the feature vector may be a spreadsheet or may be generated from a spreadsheet. For example, the feature vector may be a spreadsheet with each row representing data for each pixel of the image. The columns of the spreadsheet may represent the different values from the different data sources. For instance, for one pixel, a row may include the numerical value representing the pixel from the image and one or more of the average heights of the point cloud data for the pixel, soil data for the pixel, elevation data for the pixel, radar data for the pixel, slope data for the pixel, etc. Each row of the spreadsheet may have similar data for the individual pixels. In such embodiments, concatenating the different types of data into a feature vector may including adding the values for the data into the spreadsheet. Feature vector generator 220 may input the spreadsheet into machine learning model 222 as described herein.

In some embodiments, to input a spreadsheet into machine learning model 222, feature vector generator 220 may retrieve the values for the different types of data in the spreadsheet (e.g., values from the different rows) and concatenate the values into a feature vector. For example, feature vector generator 220 may collect the data from different sources and organize the data into different columns of a spreadsheet. Feature vector generator 220 may execute a program that retrieves values from the different columns column-by-column and concatenates the values into a single feature vector. Thus, feature vector generator 220 may generate a feature vector from a spreadsheet containing the different types of data about the geographical data depicted in an image.

Machine learning model 222 may comprise programmable instructions that, upon execution, cause processor 212 to output timber data (e.g., tree species and tree mensuration data) for individual pixels of an image based on feature vectors containing the image and data about a geographical location depicted in the image. Machine learning model 22 may contain or comprise one or more machine learning models (e.g., support vector machines, neural networks, random forests, regression algorithms such as a gradient boosting algorithm, etc.) that can predict individual types of timber data. Machine learning model 222 may be configured to receive feature vectors that are generated by feature vector generator 220 and determine output timber data using learned parameters and/or weights of machine learning model 222. The timber data may include forest species and/or forest mensuration data for individual pixels of the image. For example, feature vector generator 220 may execute machine learning model 222 using a feature vector for an image of a geographic area and machine learning model 222 may output predictions of the distribution and intermixing of different tree and/or plant species at the geographic locations that are depicted by different pixels of the image. In some embodiments, machine learning model 222 may instead or additionally output predictions for the total volume (e.g., amount of timber in the trees), tree count, height, and/or DBH parameters at the geographic locations that are depicted by the pixels of the image.

Model trainer 224 may comprise programmable instructions that, upon execution, cause processor 212 to train machine learning model 222 to predict timber data for various images using training data sets comprising images of geographical areas, information about the geographical areas, and a set of measurements of trees of the geographical areas. Data collector 216 may receive sets of measurements for different areas of wooded areas depicted in images. The set of measurements may be "cruise data" that is generated when technicians venture into the wooded area (e.g., the forest) depicted in the image and measure the vegetation (e.g., trees) in a series of discrete locations (e.g., plots). A plot may be a circular or other shaped area and may be any size. In one example, plots may have any size and any radius. The technicians may measure all or substantially all of the trees in the plots. In doing so, the technicians may take measurements such as the DBH, height, and/or species of the individual trees within the plots. The technicians may submit the measured data to forest inventory manager 206 or another processing entity to send to forest inventory manager 206 as ground truth data about the vegetation of the respective plots. In some embodiments, the technicians may also count and transmit a total tree count of the plots. Data collector 216 may store the sets of measurements in a database (not shown) within forest inventory manager 206 to be used as labels in training datasets.

In some embodiments, data collector 216 may receive the measured data and use a set of equations (e.g., allometric equations) to determine the volume and other information about the vegetation of the respective plots. For instance, data collector 216 may use allometric equations on the measured data to determine the volume of the trees that were measured within the plots. Data collector 216 may also use the measured data to determine the average and/or maximum height and/or DBH of the trees within the plots (e.g., determine the average height or DBH based on the measurements from the measured trees and/or identify the maximum height and/or DBH based on the highest measurements). Accordingly, from the set of measurements that the technicians measure and transmit to forest inventory manager 206, data collector 216 may determine the volume, average height, average DBH, maximum height, maximum DBH, species, and/or total tree count of individual plots within a geographic area as the ground truth data for the plot.

Model trainer 224 may correlate the set of measurements with the pixels of the image. To do so, model trainer 224 may identify the pixel or set of pixels of the image that correspond to the plots from which the set of measurements were taken. Model trainer 224 may identify rows of the spreadsheet that correspond to the pixels of the plots and insert the ground truth data that model trainer 224 determines from the set of measurements into the identified rows. Thus, model trainer 224 may correlate the set of measurements with the pixels of the image to create a labeled training data set that indicates the correct predictions machine learning model 222 should make based on the image data, climate data, point cloud data, and/or other data about the geographical region depicted in the image.

Model trainer 224 may train machine learning model 222 based on the output of machine learning model 222 and the set of measurements. For example, model trainer 224 may input the spreadsheet with the labels for the correct outputs, the image, and the other data into machine learning model 222. Model trainer 224 may execute machine learning model 222 and receive predicted outputs of timber data. Model trainer 224 may compare the predicted output (e.g., predicted timber data) with the expected output (e.g., expected timber data) for the different pixels and use a loss function or another supervised training technique based on the differences between the two values for the individual pixels to train machine learning model 222. Model trainer 224 may use backpropagation to determine a gradient for the respective loss function and update the weights and/or parameters of machine learning model 222 using the gradient, such as by using gradient descent techniques.

Data post-processor 226 may comprise programmable instructions that, upon execution, cause processor 212 to process the output timber data from machine learning model 222 to normalize the data for individual geographic regions. For example, different geographic regions may have set characteristics outside of the characteristics that are input into machine learning model 222 to generate timber data. Examples of such characteristics may be differences in species, climate, and soil type. To enable machine learning model 222 to be used for a diverse set of geographic areas with varying outside factors, and to reduce the number of inputs into machine learning model 222, data post-processor 226 may account for the different areas by using a normalization factor that is individually associated with the respective area to normalize an output for timber data for an image depicting the area. Such normalization factors may be stored in normalization database 230 (e.g., a relational database that contains normalization factors for different types of timber data for different geographic regions) in a look-up table that may be searched based on an input identifying the geographic area. Data post-processor 226 may determine if the timber data needs to be normalized for an image of a geographic area by receiving an input identifying the geographic area and using the input as a look-up in normalization database 230.

If the data post-processor 226 identifies a normalization factor for the geographic area depicted in an image, data post-processor 226 may adjust the output timber data using the normalization factor. The normalization factor may be used as a multiplier or a divisor and may be specific to different types of timber data such as differences in species, climate, and soil type. Different geographic regions may have different normalization factors for any number of types of timber data. Data post-processor 226 may retrieve the output timber data from machine learning model 222 and apply the normalization factor to the output timber data to generate adjusted timber data for each pixel of an image.

Overlay generator 228 may comprise programmable instructions that, upon execution, cause processor 212 to generate interactive overlays comprising timber data for individual pixels of images based on the outputs from machine learning model 222 and/or data post-processor 226. Overlay generator 228 may generate an interactive overlay from timber data. Overlay generator 228 may do so by identifying the pixels that correspond to predicted timber data and/or, in cases where adjustment is required, adjusted timber data. Overlay generator 228 may assign the timber data to the corresponding pixels and generate an overlay with pixels that mirror the pixels of the image. Overlay generator 228 may configure the different pixels of the overlay such that when a user places a cursor over a pixel or otherwise selects the pixel, the overlay will display the timber data for the pixel. Overlay generator 228 may place or append the interactive overlay over the image so a user may easily view the timber data for the geographic regions that are depicted by the individual pixels.

Figure 3:
FIG. 3 is a photograph of an overhead view of a wooded area, in accordance with some embodiments.

Referring now to FIG. 3, a photograph 300 of an overhead view of a wooded area is shown, in accordance with some embodiments. The wooded area of photograph 300 may include a series of rivers and a varied landscape of mountains and plains. As illustrated, a few locations on photograph 300 are highlighted with circles. The circles may indicate locations (e.g., plots) of the geographical region depicted in the image in which one or more technicians visited and took sets of measurements of the trees. The measurements from the different locations may be used to train a machine learning model to predict timber data for individual pixels of images using photograph 300 and corresponding SAR imagery, other optical data, geospatial data, and a point cloud of a digital surface model of the geographical area depicted in photograph 300.

Figure 4:
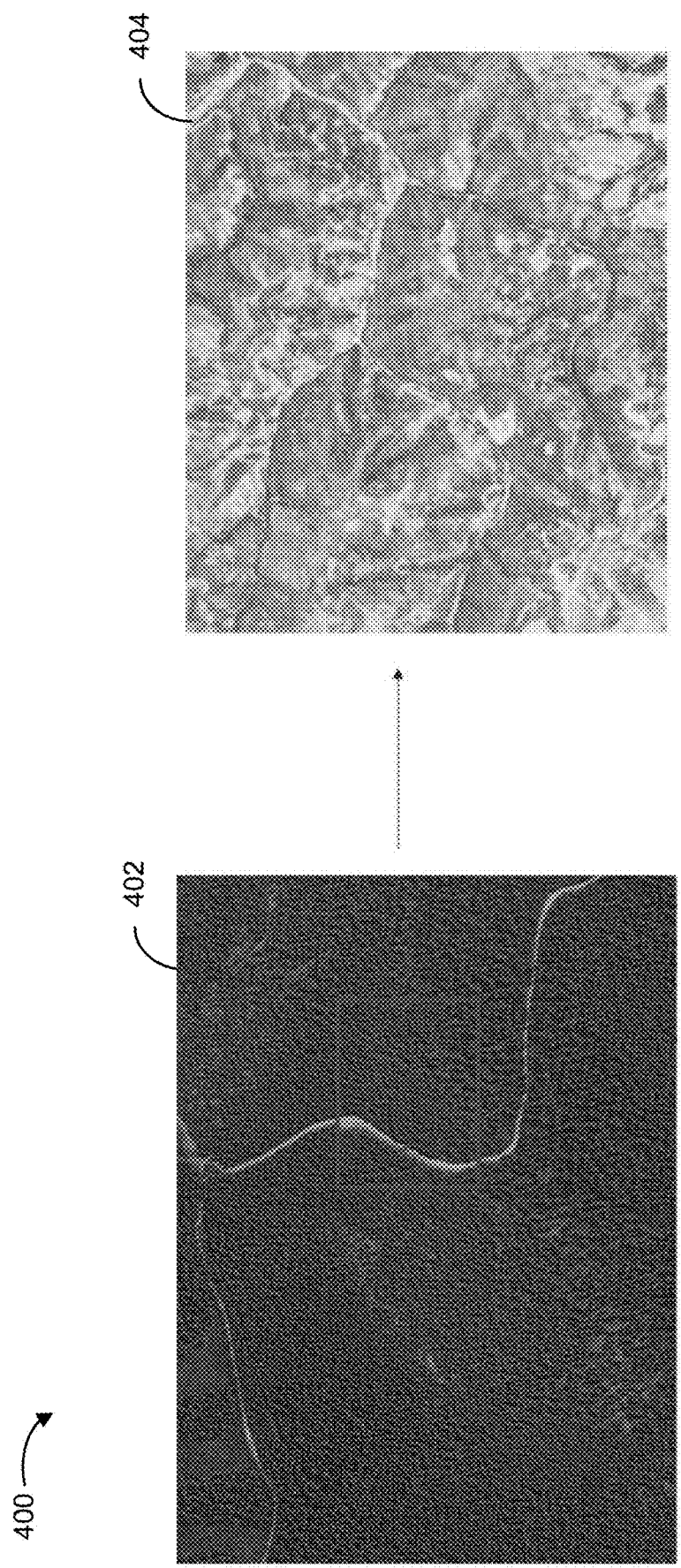
FIG. 4 is a sequence diagram of zooming in on a particular region of a photograph, in accordance with some embodiments.

Referring now to FIG. 4, a sequence diagram of a sequence 400 of zooming in on a particular region of a photograph 402 is shown, in accordance with some embodiments. Sequence 400 may be initiated when a data processing system (e.g., forest inventory manager 206) receives a request from a client device asking for the volume of the timber within a highlighted portion of photograph 402. The data processing system may receive such a request after executing a machine learning model to generate timber data for the pixels of photograph 402 or the data processing system may execute the machine learning model in response to receiving the request. The data processing system may identify the pixels in the highlighted portion and the timber data of the pixels within the highlighted portion. The identified pixels are represented as zoomed-in image 404. The data processing system may aggregate the volumes that correspond to the pixels within the highlighted portion of photograph 402 or zoomed-in image 404 to generate a total volume for the highlighted portion. The data processing system may then transmit the total volume to the requesting device in a record with any other timber data that the device may have requested.

Figure 5B:
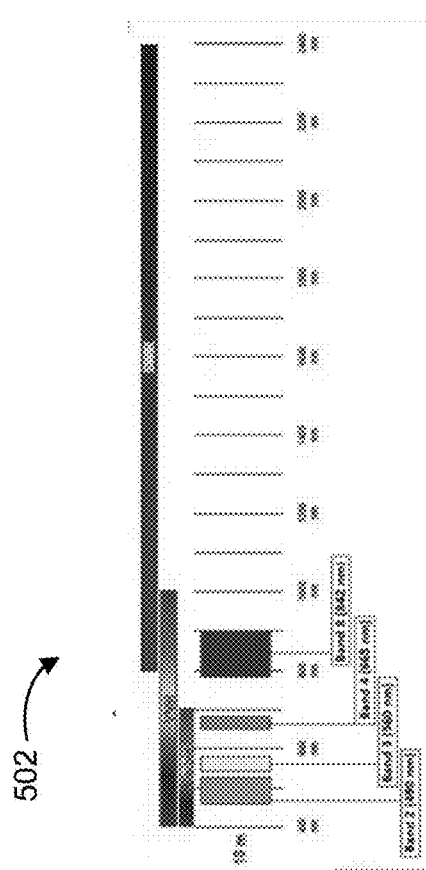
FIGS. 5A and 5B depict different light bands with which satellite images may be collected and an image that is captured using one of the light bands, in accordance with some embodiments.
Figure 5A:
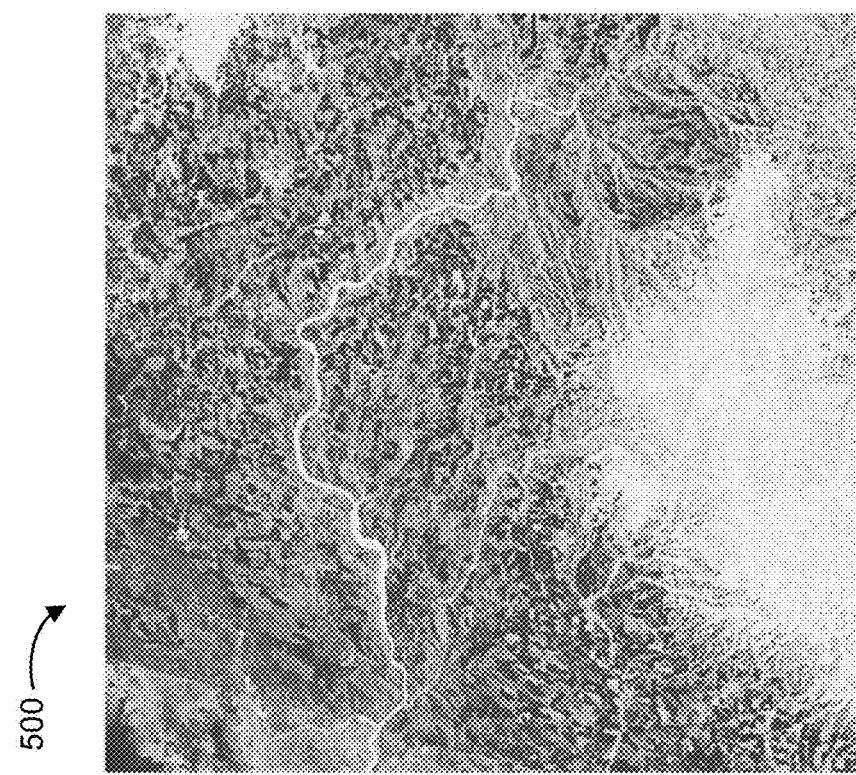

Referring now to FIGS. 5A and 5B, an illustration of light bands 502 with which different satellite images may be collected and an image 500 that is captured using one of the light bands is shown, in accordance with some embodiments. The different light bands of light bands 500 may each represent different light spectrums that a satellite may use to capture overhead images of different landscapes and wooded areas. Photographs taken using the different light bands may each have different levels of detail and may, in combination with other data (e.g., geospatial data and digital surface model data), be used to predict timber data for different pixels of an image. For example, image 502 may depict a wooded area in band 2 of light bands 500. Image 502 may be concatenated into a feature vector with images of the same area in different light bands and/or a standard image, as well as geospatial and radar data, digital surface model data, and SAR imagery of the geographical area to predict timber data for individual pixels of one of the images of the area that was used as an input. This combination of data may allow the machine learning model to accurately predict timber data for the individual pixels of the image with a higher accuracy than other systems that just typically rely on the image data itself to predict timber data. Particularly, the inclusion of the digital surface model data in the input data may substantially improve the accuracy of the predicted timber data.

Figure 6:
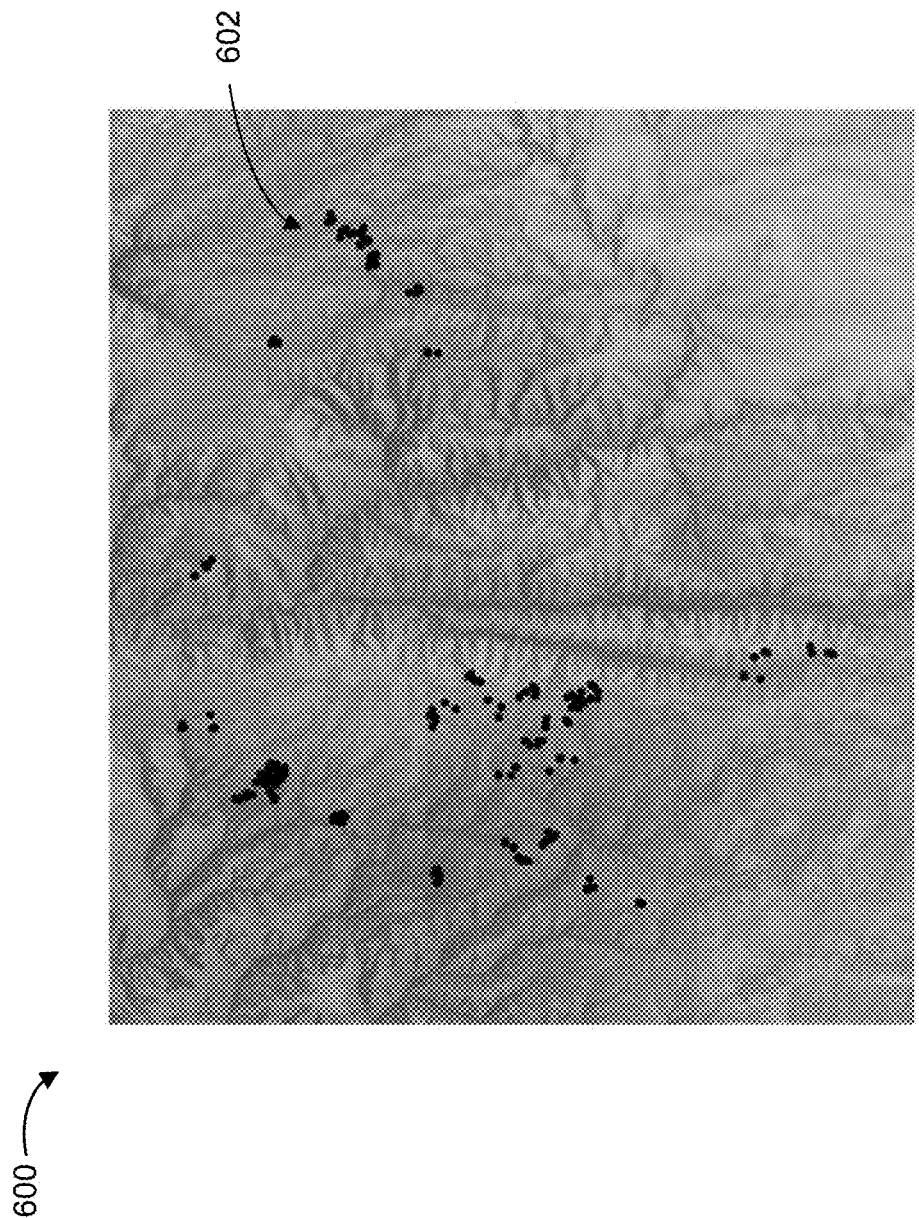
FIG. 6 is a photograph of an overhead view of a wooded area annotated with plots from which tree measurements have been collected, in accordance with some embodiments.

Referring now to FIG. 6, a photograph 600 of an overhead view of a wooded area annotated with plots from which tree measurements have been collected is shown, in accordance with some embodiments. Photograph 600 may be similar to photograph 300, shown and described with reference to FIG. 3, but with less magnification in the lens that captured photograph 600. Using the systems and methods described herein, a data processing system (e.g., forest inventory manager 206) may train a machine learning model to receive such images with other data about the depicted region to predict timber data for the pixels of photograph 600. As illustrated, similar to photograph 300, photograph 600 includes markers 602 for locations at which technicians collected measurement data of trees. Such data may be used to train a machine learning model to predict timber data for images such as photograph 600 despite the images showing a less nuanced view of a wooded area. Accordingly, an advantage to using the systems and methods described herein is that the machine learning model may be trained to predict timber data for images irrespective of the resolution of the image taken by the satellite. The systems may do so as a result of the DSM data that provides a nuanced view of the depicted area in combination with geospatial and radar data.

Figure 7:
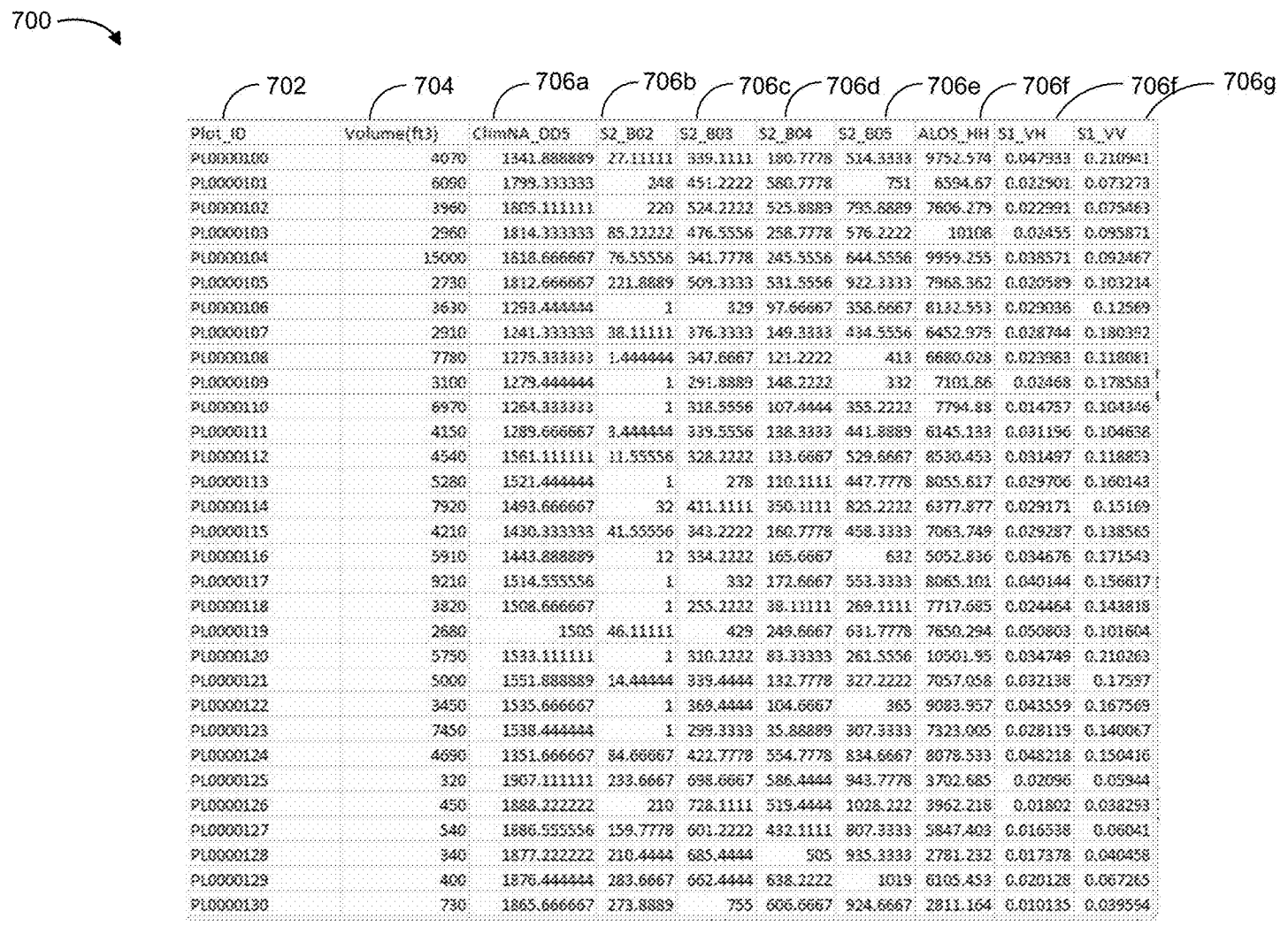

Referring now to FIG. 7, an example of a training data set 700 for training a machine learning model to generate timber data is shown, in accordance with some embodiments. As illustrated, training data set 700 may include columns for the different types of data that can be input into a machine learning model with an image to obtain timber data for individual pixels of the image. Training data set 700 may include a column 702 of plot identification numbers for the different plots from which data was collected. The plots may each correlate to a specific set of pixels of the image. Training data set 700 may also include a column 704 of the volumes at the different plots. The volume may have been calculated from the measurements the technicians captured at the respective plots. Column 704 for the volumes of the plots may operate as a label column indicating the correct predictions for the pixels that correspond to the plots for which the volumes were determined. A data processing system (e.g., forest inventory manager 206) may generate a feature vector of the optical data, SAR imagery data, digital surface model data, and geospatial data of columns 706a-706g as well as an overhead image of a wooded area and use the feature vector as an input into a machine learning model to obtain predicted volumes for the different pixels of the image. The data processing system may compare the predicted volume to the corresponding volume values of column 704, determine differences between the volumes, and train the machine learning model based on the differences. Accordingly, the data processing system may use training data set 700 to train the machine learning model to predict volumes of different pixels of images. The machine learning model may similarly be trained to predict one or more other timber data types or individual machine learning models may be individually trained to predict the different types of timber data.

Figure 8:
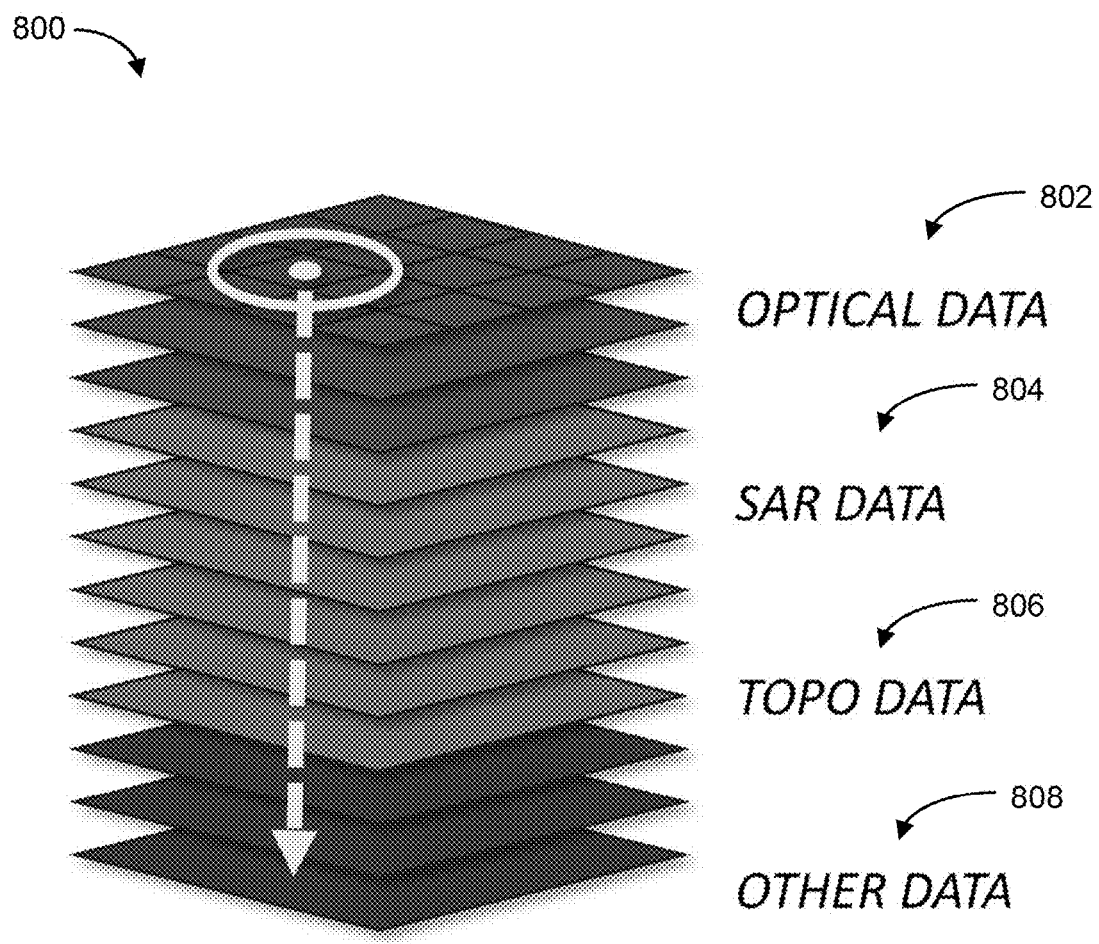
FIG. 8 is an illustration of an example feature vector that can be used as an input into a machine learning model to generate timber data, in accordance with some embodiments.

Referring now to FIG. 8, a graphical view of an example feature vector 800 that can be used as input into a machine learning model to generate timber data is shown, in accordance with some embodiments. Feature vector 800 may include optical data 802 (e.g., images captured using different light spectrums), SAR data 804 (e.g., radar data), topographical data 806 (e.g., elevation data), and other data 808 (e.g., digital surface model data, climate data, soil data, etc.). The different types of data of feature vector 800 may each have values that correspond to the same pixel of an image and/or a common geographical region depicted by the image. Accordingly, a data processing system (e.g., forest inventory manager 206) may use feature vector 800 to predict timber data for a geographical region more accurately (e.g., 15-20% more accurately) than systems that do not use the specific combination of data of feature vector 800 to generate machine learning model predictions.

In some embodiments, example feature vector 800 may be a training data set that can be used to train a machine learning model to predict timber data for pixels of images. The data of the feature vector 800 may be aggregated from different sources and combined. For example, the data may be processed so each data type has a matching resolution to each other and corresponds to the same location or area of a geographical region depicted in an image. The data may also be reviewed by reviewers to remove any outliers that may be introduced as a result of typographical errors or seemingly random weather patterns that do not accurately reflect the area. The data may then be introduced as an input into the machine learning model for training to predict timber data for individual pixels of images.

In some embodiments, during the training process, the parameters and weights of the machine learning model may be checked and adjusted to reduce any overtraining that may occur as a result of one training data set. For instance, a reviewer or the data processing system may review the weights of the machine learning model and any changes to the weights that may occur as a result of one training run and reduce the change that resulted from the training run (e.g., reduce the change if the change exceeds a threshold).

In some embodiments, the data processing system may train machine learning models to predict timber data for images over time and select the models that make the most accurate predictions to use in practice. For example, after inputting a series of training data sets into the machine learning models for training, the data processing system may evaluate the accuracy of the models by comparing the models' outputs against the expected values. The data processing system may select the machine learning model with the highest accuracy to use upon receiving a request to generate timber data for a geographical area.

In some embodiments, the data processing system may train machine learning models and select the models that require the least amount of input variables while still being accurate above a threshold. For example, the data processing system determine a machine learning model may have a 90% accuracy with image data, elevation data, DSM data, and soil data, and an 80% accuracy with image data, climate data, and DSM data. The data processing system may compare each accuracy to a defined accuracy threshold of 75% and determine to use the machine learning model with the 80% accuracy because the model uses less inputs and still has an accuracy that exceeds the threshold.

In some embodiments, the data processing system may train machine learning models to predict timber data for individual variables (e.g., one machine learning model may predict timber volume, another machine learning model may predict trees species data, another machine learning model predict maximum tree height, etc.). Accordingly, when the data processing system receives a request for an overall forest inventory of an area, the data processing system may input the same image and data for the area in each machine learning model to obtain all of the requested timber data.

In summary, the data processing system may receive training data from a variety of data source providers as different types of data regarding different geographical regions. The data processing system may intersect the data to match the data that corresponds to the same geographical area or region. The data may then be reviewed for anomalous values and processed into a training data set. The training data set may be used to train one or more machine learning models (e.g., a gradient boosting machine learning model). The data processing system may tune the parameters of the machine learning model to avoid overtraining and perform a model selection process to identify the machine learning models that are accurate and require the least amount of inputs.

Figure 9:
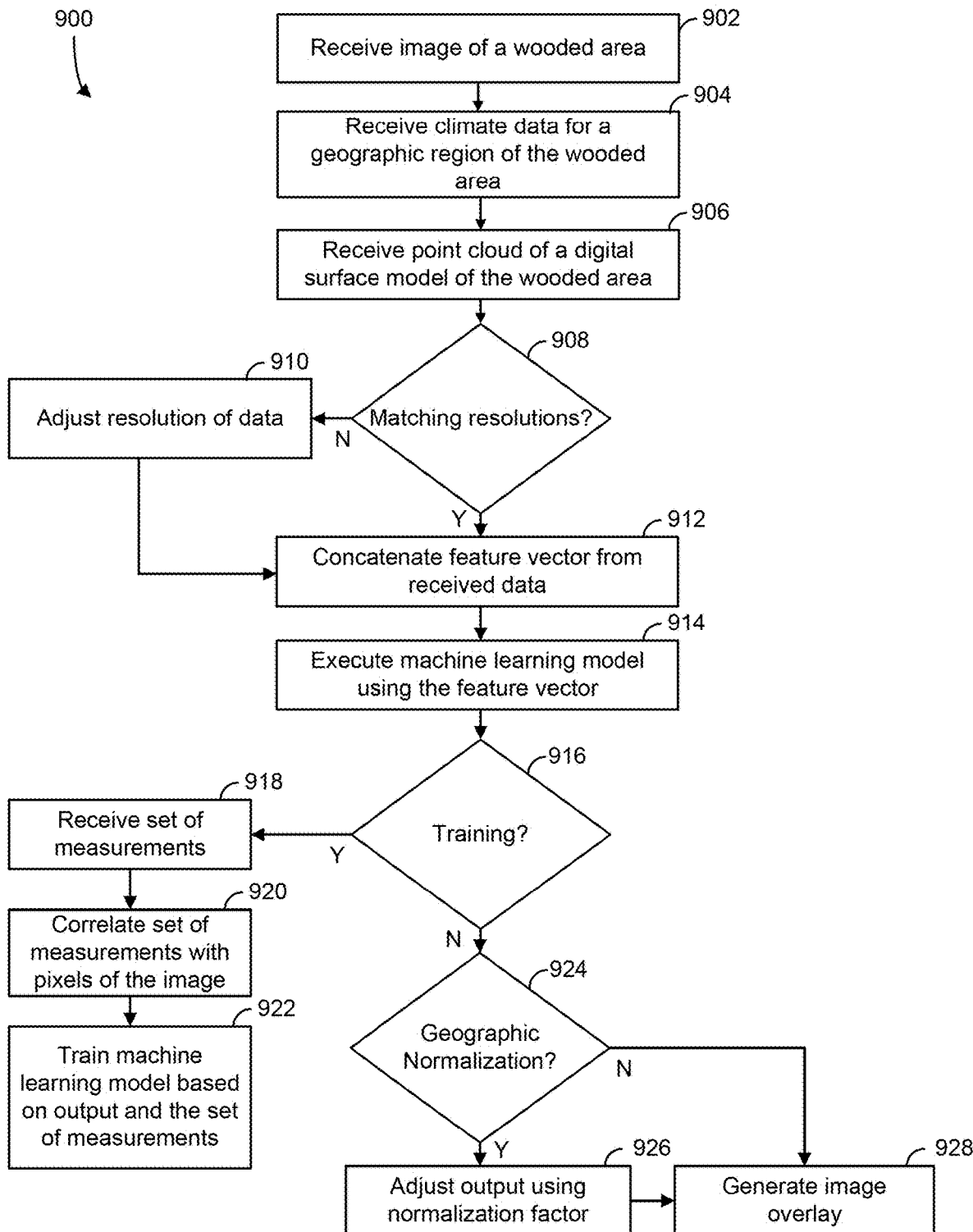
FIG. 9 is an example method for forest inventory management, in accordance with some embodiments.

Referring now to FIG. 9, an example method 900 for improved forest inventory management is shown, in accordance with some embodiments. Method 900 can be performed by a data processing system (a client device or a forest inventory manager 206, shown and described with reference to FIG. 2, a server system, etc.). Method 900 may include more or fewer operations and the operations may be performed in any order. Performance of method 900 may enable the data processing system to generate timber data indicating characteristics about the volume, height, species mix, tree count, DBH parameters, and other characteristics about the vegetation that is depicted in an aerial image of a wooded area (e.g., a forest). The data processing system may collect data about such a wooded area including SAR imagery, optical imagery (e.g., a photograph captured by a satellite), geospatial data, and data from a digital surface model of the wooded area. The data processing system may concatenate the collected data into a feature vector. The data processing system may then input the feature vector into a machine learning model and receive timber data (e.g., species data and different types of trees mensuration data) about the wooded data at the regions represented by the pixels of the image of the wooded area. The data processing system may then generate an interactive overlay with the timber data and overlay the interactive overlay onto the image such that when a user places a cursor over or selects different pixels, the overlay may display timber data about the region represented by the selected pixel. The combination of inputs into the machine learning model may enable the machine learning model to make predictions that are more accurate than other systems that attempt to determine forest inventory data using aerial imagery.

At operation 902, the data processing system may receive an image of a wooded area. The image may be an optical photograph of the wooded area taken from above the wooded area such as by a satellite or another flying vehicle. The data processing system may receive the image of the wooded area from an entity or company that specializes in capturing and transmitting such photographs. For example, the data processing system may receive the image from an ESA Sentinel-2 satellite. Additionally, in some embodiments, the data processing system may receive photographs or radar data of the wooded area such as photographs or radar data collected from ESA Sentinel-1 and/or ALOS-2 PALSAR satellites.

At operation 904, the data processing system may receive climate data for a geographic region of the wooded area. The geographic region may be the geographic area and/or coordinates of the wooded area (e.g., the climate data for the coordinates of the geographic area). The climate data may include information about the climate of the wooded area (e.g., precipitation, temperature, solar radiation, etc.). The data processing system may receive the climate data from an online database or from a data source provider that collects and maintains records of the climates around the world (e.g., weather service providers, ClimNA, etc.). In some embodiments, the data processing system may receive other data related to the wooded area such as the elevation and slope at different points within the wooded area or of the wooded area as a whole. The data processing system may receive such data from online data source providers such as, but not limited to, the USGS National Elevation Dataset. In some embodiments, the data processing system may collect or receive soil data (e.g., the types of soil, the amount of soil, the PH level of the soil, etc.) about the wooded area. The data processing system may receive such soil data from data source providers such as, but not limited to, the gNATSGO database.

At operation 906, the data processing system may receive point cloud data of a digital surface model for the wooded area. The point cloud data may include the maximum height of the wooded area at various points. For example, the point cloud data may indicate the maximum height of the wooded area to be the highest points on trees, buildings, hills, etc., within the wooded area. The point cloud data may have a 25 cm resolution (e.g., the point cloud may indicate the maximum height every 25 cm within the wooded area), or a resolution that is sharper than the resolution of the climate data and/or optical or radar data. The data processing system may receive the point cloud data from a data source provider that provides digital surface models for various geographic regions.

At operation 908, the data processing system may determine if the image, the climate data, and/or the point cloud of the digital surface model have matching resolutions. For example, because the different types of data are collected from different sources and generally collected using different methods, the data may be collected with different granularities and with different levels of detail. For example, the climate data and/or soil data may be generic across the wooded area because there may not be much of a difference in climate or soil between the areas represented by the pixels of the image. However, other data, such as point cloud data, elevation data, and/or slope data, may have a higher resolution than the pixels of the image as it may be captured using a more nuanced device. The data processing system may compare the resolutions of the different types of data, including the image, the data processing system has collected about the wooded area to determine if the data and the image have matching resolutions.

At operation 910, the data processing system may adjust the resolutions of the data in response to determining the data does not have a matching resolution. For example, the data processing system may determine the point cloud data of the digital surface model for the geographic region of the wooded area has a resolution of 25 centimeters and the resolution of the image is 10 meters. Accordingly, the data processing system may reduce the resolution of the point cloud data to match the resolution of the image. To do so, the data processing system may identify the values (e.g., the height values) of the point cloud data that correspond to individual pixels of the image (e.g., correspond to the same geographic area as the individual pixels of the image). The data processing system may determine the average height values of the identified values for each pixel of the image and generate a vector from the average height values with a number of dimensions that match the number of pixels of the image (e.g., a vector with an average height value for each pixel of the image). Similarly, in another example, the data processing system may normalize the climate data, elevation data, slope data, and/or soil data into a vector that matches the number of pixels of the image. Such a vector may include the same value at each index value of the image unless more fine-grained data (e.g., higher resolution data) about the soil, climate, or elevation is available for the geographic area that is depicted in the image. This preprocessing technique may enable the data processing system to evaluate the image and determine timber data for the image on a pixel-by-pixel basis.

At operation 912, the data processing system may concatenate a feature vector from the received data. The data processing system may do so in response to determining, at operation 908, the collected data has a matching resolution to the image and/or after pre-processing the received data at operation 910. The data processing system may concatenate the values of the point cloud (e.g., the adjusted values of the point cloud) and the climate data to the image vector to create a feature vector that can be input into a machine learning model. In some embodiments, the data processing system may additionally or instead concatenate soil data, radar data, elevation data, etc., about the geographic region with the image vector to create the feature vector. Accordingly, the data processing system may generate a feature vector using the image and information about the geographic region depicted in the image that can be input into a machine learning model to generate timber data about the vegetation of the wooded area depicted in the image.

In some embodiments, the feature vector may be a spreadsheet or may be generated from a spreadsheet. For example, the feature vector may be a spreadsheet with each row representing data for each pixel of the image. The columns of the spreadsheet may represent the different values from the different data sources. For instance, for one pixel, a row may include the numerical value representing the pixel from the image and one or more of the average height of the point cloud data for the pixel, soil data for the pixel, elevation data for the pixel, radar data for the pixel, slope data for the pixel, etc. Each row of the spreadsheet may have similar data for the individual pixels. In such embodiments, concatenating the different types of data into a feature vector may including adding the values for the data into the spreadsheet. The data processing system may input the spreadsheet into the machine learning model as described herein.

In some embodiments, to input a spreadsheet into the machine learning model, the data processing system may retrieve the values for the different types of data in the spreadsheet (e.g., values from the different rows) and concatenate the values into a feature vector. For example, the data processing system may collect the data from different sources and organize the data into different columns of a spreadsheet. The data processing system may execute a program that retrieves values from the different columns column-by-column and concatenates the values into a single feature vector. Thus, the data processing system may generate a feature vector from a spreadsheet containing the different types of data about the geographical data depicted in an image.

At operation 914, the data processing system may execute a machine learning model (e.g., a support vector machine, a neural network, a random forest, a regression algorithm such as a gradient boosting algorithm, etc.). The machine learning model may be configured to receive the feature vector that was generated at operation 912 and determine output timber data using learned parameters and/or weights to predict timber data based on the feature vector. The timber data may include forest species and/or forest mensuration data for individual pixels of the image. For example, the data processing system may execute the machine learning model using the feature vector and the machine learning model may output predictions of the distribution and intermixing of different tree and/or plant species at the geographic locations that are depicted by different pixels of the image. The machine learning model may instead or additionally output predictions for the total volume (e.g., amount of timber in the trees), tree count, height, and/or DBH parameters at the geographic locations that are depicted by the pixels of the image.

At operation 916, the data processing system may determine if the feature vector is being used to train the machine learning model. The data processing system may do so by determining if any labels correspond to the correct predictions for the timber data for individual pixels of the image. For example, the data processing system may parse a spreadsheet to determine if there is a column for "correct" values for what the machine learning model should have predicted based on the input feature vector. If the data processing system identifies such a column, the data processing system may determine the input feature vector is to be used for training, otherwise, the data processing system may determine the input feature vector is not to be used for training. In some embodiments, the data processing system may determine if the feature vector is to be used for training based on whether the instructions that the data processing system is processing include instructions to train the machine learning model according to labels indicating the correct predictions for individual pixels (or sets of pixels) of the image.

If the feature vector is being used to train the machine learning model, at operation 918, the data processing system may receive a set of measurements for different areas of the wooded area depicted in the image. The set of measurements may be "cruise data" that is generated when technicians venture into the wooded area (e.g., the forest) depicted in the image and measure the vegetation (e.g., trees) in a series of discrete locations (e.g., plots). A plot may be a circular or other shaped area and may be any size. The technicians may measure all or substantially all of the trees in the plots. In doing so, the technicians may take measurements such as the DBH, height, and/or species of the individual trees within the plots. The technicians may submit the measured data to the data processing system or another processing entity to send to the data processing system as ground truth data about the vegetation of the respective plots. In some embodiments, the technicians may also count and transmit a total tree count of the plots.

In some embodiments, the data processing system may receive the measured data and use a set of equations (e.g., allometric equations) to determine the volume and other information about the vegetation of the respective plots. For instance, the data processing system may use allometric equations on the measured data to determine the volume of the trees that were measured within the plots. The data processing system may also use the measured data to determine the average and/or maximum height and/or DBH of the trees within the plots (e.g., determine the average height or DBH based on the measurements from the measured trees and/or identify the maximum height and/or DBH based on the highest measurements). Accordingly, from the set of measurements that the technicians measure and transmit to the data processing system, the data processing system may determine the volume, average height, average DBH, maximum height, maximum DBH, species, and/or total tree count of individual plots within a geographic area as the ground truth data for the plot.

At operation 920, the data processing system may correlate the set of measurements with the pixels of the image. To do so, the data processing system may identify the pixel or set of pixels of the image that correspond to the plots from which the set of measurements were taken. The data processing system may identify rows of the spreadsheet that correspond to the pixels of the plots and insert the ground truth data that the data processing system determines from the set of measurements into the identified rows. Thus, the data processing system may correlate the set of measurements with the pixels of the image to create a labeled training data set that indicates the correct predictions the machine learning model should make based on the image data, climate data, point cloud data, and/or other data about the geographical region depicted in the image.

At operation 922, the data processing system may train the machine learning model based on the output of the machine learning model and the set of measurements. For example, the data processing system may input the spreadsheet with the labels for the correct outputs, the image, and the other data into the machine learning model. The data processing system may execute the machine learning model and receive predicted outputs of timber data. The data processing system may compare the predicted output (e.g., predicted timber data) with the expected output (e.g., expected timber data) for the different pixels and use a loss function or another supervised training technique based on the differences between the two values for the individual pixels to train the machine learning model. The data processing system may use backpropagation to determine a gradient for the respective loss function and update the weights and/or parameters of the machine learning model using the gradient, such as by using gradient descent techniques.

If the data processing system determines that the feature vector is not being used for training at operation 916, at operation 924, the data processing system may determine if the output timber data needs to be normalized based on the geographic region depicted in the image. For example, different geographic regions may have set characteristics outside of the characteristics that are input into the machine learning model to generate timber. Examples of such characteristics may be the air quality, proximity to human civilization, volcanoes in the area, proximity to the ocean, etc. To enable the same machine learning model to be used for a diverse set of geographic areas with varying outside factors, and to reduce the number of inputs into the machine learning model, the data processing system may account for the different areas by using a normalization factor that is individually associated with the respective area to normalize an output for timber data for an image depicting the area. Such normalization factors may be stored in a database within the data processing system in a look-up table that may be searched based on an input identifying the geographic area. The data processing system may determine if the timber data needs to be normalized for an image of a geographic area by receiving an input identifying the geographic area and using the input as a look-up in the database.

If the data processing system identifies a normalization factor for the geographic area depicted in the image, at operation 926, the data processing system may adjust the output timber data using the normalization factor. The normalization factor may be used as a multiplier or a divisor and may be specific to different types of timber data. For example, if the geographic region is the salt flats in Utah, the normalization factor for images that depict the salt flats may be to reduce the tree volume by a factor of two and a tree count by a factor of four. Different geographic regions may have different normalization factors for any number of types of timber data. The data processing system may retrieve the output timber data from the machine learning model and apply the normalization factor to the output timber data to generate adjusted timber data for each pixel of the image.

At operation 928, the data processing system may generate an interactive overlay from the timber data (e.g., adjusted timber data). The data processing system may do so by identifying the pixels that correspond to predicted timber data and, in cases where adjustment is required, adjusted timber data. The data processing system may assign the timber data to the corresponding pixels and generate an overlay with pixels that mirror the pixels of the image. The data processing system may configure the different pixels of the overlay such that when a user places a cursor over a pixel or otherwise selects the pixel, the overlay will display the timber data for the pixel. The data processing system may place the interactive overlay over the image so a user may easily view the timber data for the geographic regions that are depicted by the individual pixels.

In some embodiments, after generating timber data for the individual pixels of the image, the data processing system may be able to determine timber data for various regions within the image based on the determined timber data for the individual pixels. For example, the data processing system may receive a request for the timber data in a specific area (e.g., volume, height, species, and/or total tree count of a particular area depicted in the photograph). The data processing system may identify the pixels that depict the particular area and the timber data that has been assigned to the individual pixels. Depending on the request, the data processing system may aggregate or take the average of the timber data of all of the pixels that depict the area and generate aggregated timber data to provision (e.g., make available in a software as a service environment and/or transmit) to the requesting device. For instance, to provision the total volume of the area the data processing system may aggregate the volume for each pixel within the area. To provision the species, the data processing system may aggregate the different species for each pixel. To provision the average height or DBH, the data processing system may determine an average height or DBH of all of the trees of the pixels in the area. To provision the maximum height or DBH, the data processing system may identify the maximum height or DBH of all of the pixels in the area. Thus, to determine timber data for a particular geographical area, the data processing system may simply extract the values for the pixels that depict the geographical area generating more accurate timber data for the area compared with previous systems that often estimate data for the area based on data from a portion of the area.

It is to be understood that any examples, values, graphs, tables, and/or data used herein are simply for purposes of explanation and are not intended to be limiting in any way. Further, although the present disclosure has been discussed with respect to dam monitoring, in other embodiments, the teachings of the present disclosure may be applied to similarly monitor other structures.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-implemented method for automated forest inventory mapping, comprising:
   receiving, by one or more processors, an image depicting an overhead view of a wooded area, the image comprising a plurality of pixels;
   receiving, by the one or more processors, a set of climate data for a geographic region in which the wooded area is located;
   receiving, by the one or more processors, point cloud data of a digital surface model of the wooded area;
   processing the point cloud data by normalizing a resolution of the point cloud data to match a resolution of the image by computing average height values for points corresponding to each pixel and generating a height vector matching dimensions of the image;
   concatenating, by the one or more processors, data corresponding to the plurality of pixels of the image, the set of climate data, and the point cloud data into a feature vector;
   executing, by the one or more processors, a machine learning model using the feature vector to generate timber data for each of the plurality of pixels of the image by:
      processing the feature vector through the machine learning model, wherein the machine learning model has been trained using ground truth data comprising tree measurements and correlated training feature vectors generated from satellite imagery, climate data, and point cloud data of the wooded area;
      generating, for each pixel, timber data; and
      applying a geographic normalization factor retrieved from a database based on the geographic region to adjust the generated timber data;
   generating, by the one or more processors, a visualization overlay from the timber data; and
   displaying the visualization overlay on a graphical user interface, wherein the visualization overlay enables real-time interaction with the timber data through user selection of individual pixels to view detailed timber metrics for corresponding geographic locations.

2. The method of claim 1, further comprising:
   receiving, by the one or more processors, soil data and elevation data for the geographic region,
      wherein concatenating the data, the set of climate data, and the point cloud data into the feature vector further comprises concatenating, by the one or more processors, the soil data and the elevation data into the feature vector.

3. The method of claim 1, further comprising:
   receiving, by the one or more processors, a set of tree measurements for a plurality of regions within the wooded area, the set of tree measurements comprising measurements for individual trees of the plurality of regions;
   correlating, by the one or more processors, the set of tree measurements for the plurality of regions with sets of pixels of the image; and
   training, by the one or more processors, the machine learning model according to a loss function based on the generated timber data for the sets of pixels and the set of tree measurements.

4. The method of claim 3, wherein receiving the set of tree measurements for the plurality of regions comprises receiving, by the one or more processors, tree species, tree diameter at breast height, tree volume, and tree count for trees within the plurality of regions.

5. The method of claim 1, further comprising:
   retrieving, by the one or more processors from a database, a geographic normalization factor based on the geographic region of the wooded area; and
   adjusting, by the one or more processors, the timber data based on the geographic normalization factor,
   wherein generating the visualization overlay from the timber data comprises generating, by the one or more processors, the visualization overlay from the adjusted timber data.

6. The method of claim 1, wherein executing the machine learning model using the feature vector to generate the timber data comprises executing, by the one or more processors, the machine learning model using the feature vector to generate tree height, tree species, tree diameter at breast height, or tree count for trees within areas represented by the plurality of pixels.

7. The method of claim 1, wherein receiving the point cloud data of the digital surface model of the wooded area comprises receiving, by the one or more processors, height values of a surface of the wooded area.

8. The method of claim 7, further comprising:
   reducing, by the one or more processors, a model resolution of the point cloud data to match an image resolution of the image,
   wherein concatenating the point cloud data into the feature vector comprises concatenating, by the one or more processors, the point cloud data with the reduced model resolution into the feature vector.

9. The method of claim 1, further comprising:
   configuring, by the one or more processors, the visualization overlay to display timber data for areas represented by individual pixels of the plurality of pixels when a cursor overlays the individual pixels or upon a selection of an individual pixel, wherein the timber data comprises at least one of tree species distribution indicating intermixing of different tree species, tree mensuration data comprising estimates of total timber volume, tree count, tree height, and diameter at breast height (DBH) parameters.

10. The method of claim 1, further comprising:
    receiving, by the one or more processors from a client device, a request for regional timber data of a region of the wooded area;
    aggregating, by the one or more processors, timber data associated with pixels of the plurality of pixels that depict the region of the wooded area; and
    provisioning, by the one or more processor, the aggregated timber data to the client device.

11. The method of claim 1, wherein concatenating the data corresponding to the plurality of pixels of the image, the set of climate data, and the point cloud data into a feature vector comprises adding, by the one or more processors, the data corresponding to the plurality of pixels of the image, the set of climate data, and the point cloud data into a spreadsheet.

12. A system for automated forest inventory mapping, the system comprising:
one or more processors configured by machine-readable instructions to:
receive an image depicting an overhead view of a wooded area, the image comprising a plurality of pixels;
receive a set of climate data for a geographic region in which the wooded area is located;
receive point cloud data of a digital surface model of the wooded area;
process the point cloud data by normalizing a resolution of the point cloud data to match a resolution of the image by computing average height values for points corresponding to each pixel and generating a height vector matching dimensions of the image;
concatenate data corresponding to the plurality of pixels of the image, the set of climate data, and the point cloud data into a feature vector;
execute a machine learning model using the feature vector to generate timber data for each of the plurality of pixels of the image by:
processing the feature vector through the machine learning model, wherein the machine learning model has been trained using ground truth data comprising tree measurements and correlated training feature vectors generated from satellite imagery, climate data, and point cloud data of the wooded area;
generating, for each pixel, timber data; and
applying a geographic normalization factor retrieved from a database based on the geographic region to adjust the generated timber data;
generate a visualization overlay from the timber data; and
display the visualization overlay on a graphical user interface, wherein the visualization overlay enables real-time interaction with the timber data through user selection of individual pixels to view detailed timber metrics for corresponding geographic locations.

13. The system of claim 12, wherein the one or more processors are further configured to:
receive soil data and elevation data for the geographic region,
wherein the one or more processors are configured to concatenate the soil and elevation data, the set of climate data, and the point cloud data into the feature vector by concatenating the soil data and the elevation data into the feature vector.

14. The system of claim 12, wherein the one or more processors are further configured to:
receive a set of tree measurements for a plurality of regions within the wooded area, the set of tree measurements comprising measurements for individual trees of the plurality of regions;
correlate the set of tree measurements for the plurality of regions with sets of pixels of the image; and
train the machine learning model according to a loss function based on the generated timber data for the sets of pixels and the set of tree measurements.

15. The system of claim 14, wherein the one or more processors are configured to receive the set of tree measurements for the plurality of regions by receiving tree species, tree diameter at breast height, tree volume, and tree count for trees within the plurality of regions.

16. The system of claim 12, wherein the one or more processors are further configured to:
retrieve, from a database, a geographic normalization factor based on the geographic region of the wooded area; and
adjust the timber data based on the geographic normalization factor,
wherein the one or more processors are configured to generate the visualization overlay from the timber data by generating the visualization overlay from the adjusted timber data.

17. The system of claim 12, wherein the one or more processors are configured to execute the machine learning model using the feature vector to generate the timber data by executing the machine learning model using the feature vector to generate tree height, tree species, tree diameter at breast height, or tree count for trees within areas represented by the plurality of pixels.

18. A non-transitory computer-readable storage medium having instructions embodied thereon, the instructions being executable by one or more processors to perform a method, the method comprising:
receiving an image depicting an overhead view of a wooded area, the image comprising a plurality of pixels;
receiving a set of climate data for a geographic region in which the wooded area is located;
receiving point cloud data of a digital surface model of the wooded area;
processing the point cloud data by normalizing a resolution of the point cloud data to match a resolution of the image by computing average height values for points corresponding to each pixel and generating a height vector matching dimensions of the image;
concatenating data corresponding to the plurality of pixels of the image, the set of climate data, and the point cloud data into a feature vector;
executing a machine learning model using the feature vector to generate timber data for each of the plurality of pixels of the image by:
processing the feature vector through the machine learning model, wherein the machine learning model has been trained using ground truth data comprising tree measurements and correlated training feature vectors generated from satellite imagery, climate data, and point cloud data of the wooded area;
generating, for each pixel, timber data; and
applying a geographic normalization factor retrieved from a database based on the geographic region to adjust the generated timber data;
generating an interactive a visualization overlay from the timber data, the visualization overlay comprising the generated timber data for each of the plurality of pixels of the image; and
displaying the visualization overlay on a graphical user interface, wherein the visualization overlay enables real-time interaction with the timber data through user selection of individual pixels to view detailed timber metrics for corresponding geographic locations.

19. The non-transitory computer-readable storage medium of claim 18, wherein the method further comprises:
receiving soil data and elevation data for the geographic region, wherein concatenating the data, the set of climate data, and the point cloud data into the feature vector further comprises concatenating the soil data and the elevation data into the feature vector.

20. The non-transitory computer-readable storage medium of claim 18, wherein the method further comprises:
receiving a set of tree measurements for a plurality of regions within the wooded area, the set of tree measurements comprising measurements for individual trees of the plurality of regions;
correlating the set of tree measurements for the plurality of regions with sets of pixels of the image; and
training the machine learning model according to a loss function based on the generated timber data for the sets of pixels and the set of tree measurements.

\* \* \* \* \*